(12) United States Patent
Yeo et al.

(10) Patent No.: US 10,768,463 B2
(45) Date of Patent: Sep. 8, 2020

(54) DISPLAY DEVICE

(71) Applicant: Samsung Display Co., Ltd., Yongin-Si, Gyeonggi-Do (KR)

(72) Inventors: Yun Jong Yeo, Yongin-si (KR); Seon Il Kim, Yongin-si (KR); Ji Hun Kim, Yongin-si (KR); Sung Won Cho, Yongin-si (KR); Sang Youn Han, Yongin-si (KR)

(73) Assignee: Samsung Display Co., Ltd. (KR)

( * ) Notice: Subject to any disclaimer, the term of this patent is extended or adjusted under 35 U.S.C. 154(b) by 111 days.

(21) Appl. No.: 15/814,623

(22) Filed: Nov. 16, 2017

(65) Prior Publication Data

US 2018/0157083 A1 Jun. 7, 2018

(30) Foreign Application Priority Data

Dec. 5, 2016 (KR) .......................... 10-2016-0164645

(51) Int. Cl.
| | |
|---|---|
| *G02F 1/1333* | (2006.01) |
| *G02F 1/13357* | (2006.01) |
| *G02F 1/1335* | (2006.01) |
| *G06F 3/041* | (2006.01) |
| *G06F 3/042* | (2006.01) |

(52) U.S. Cl.
CPC .... *G02F 1/13338* (2013.01); *G02F 1/133514* (2013.01); *G02F 1/133602* (2013.01); *G02F 1/133617* (2013.01); *G06F 3/042* (2013.01); *G06F 3/0412* (2013.01); *G02F 2203/11* (2013.01)

(58) Field of Classification Search
CPC .......... G02F 1/13318; G02F 1/133514; G02F 2203/11; G06F 3/0412
See application file for complete search history.

(56) References Cited

U.S. PATENT DOCUMENTS

| 8,450,740 B2 | 5/2013 | Kim et al. |
| 8,598,587 B2 | 12/2013 | Yeo et al. |

(Continued)

OTHER PUBLICATIONS

Kyung-In Jang et al., "Rugged and breathable forms of stretchable electronics with adherent composite substrates for transcutaneous monitoring", Nature Communications 5:4779 doi: 10.1038/ncomms5779, Sep. 3, 2014, 10 Pages, Macmillan Publishers Limited.

*Primary Examiner* — Jessica M Merlin
(74) *Attorney, Agent, or Firm* — Innovation Counsel LLP (57) ABSTRACT

Provided herein may be a display device. The display device may include a first substrate including a first substrate having a plurality of pixel areas; a second substrate having a second base substrate facing the first substrate, first to third color filters provided on the second base substrate, the first to third color filters being respectively disposed on locations corresponding to respective pixel areas of the plurality of pixel areas and embodying different colors, and an infrared sensor disposed between the plurality of pixel areas in a plan view and configured to sense infrared light; a liquid crystal layer disposed between the first substrate and the second substrate; and a backlight unit configured to provide single-color light to the liquid crystal layer. At least one of the first to third color filters may include infrared quantum dot material which converts light provided from the backlight unit into infrared light.

15 Claims, 6 Drawing Sheets

(56) References Cited

U.S. PATENT DOCUMENTS

| | | |
|---|---|---|
| 8,698,167 B2 | 4/2014 | Kim et al. |
| 8,796,626 B2 | 8/2014 | Han et al. |
| 8,901,691 B2 | 12/2014 | Yeo et al. |
| 9,671,637 B2 | 6/2017 | Yeo et al. |
| 2014/0160408 A1* | 6/2014 | Cho .................. G02F 1/133617 349/110 |
| 2014/0175441 A1 | 6/2014 | Chin et al. |
| 2015/0287752 A1 | 10/2015 | Yeo et al. |
| 2016/0033822 A1* | 2/2016 | Jiang .................. G02F 1/13338 349/33 |
| 2016/0300974 A1 | 10/2016 | Yeo et al. |
| 2017/0277356 A1* | 9/2017 | Hsieh .................. G02F 1/13318 |

\* cited by examiner

DISPLAY DEVICE

CROSS-REFERENCE TO RELATED APPLICATION

The present application claims priority to Korean patent application no. 10-2016-0164645 filed on Dec. 5, 2016, the entire disclosure of which is incorporated herein in its entirety by reference.

BACKGROUND

Field

Various embodiments of the present disclosure relate to a display device.

Description of Related Art

A liquid crystal display controls transmission of light by rotating liquid crystal molecules using an electric field generated by two electrodes in a liquid crystal display panel and thus controls transmission of light so that an image is embodied by the transmitted light. In addition, the liquid crystal display panel includes a liquid crystal layer which includes the liquid crystal molecules, and two substrates which are respectively disposed under and on the liquid crystal layer.

The liquid crystal display may be configured to allow a user to perform a touch input of selecting, using his/her finger or an object, an instruction content displayed on a screen. Examples of touch sensors may include a capacitive touch sensor, a resistive touch sensor, an optical touch sensor, and so forth.

Recently, a display device enabling a touch input using an infrared sensor has been studied.

SUMMARY

One embodiment of the present disclosure provides a display device including: a first substrate having a plurality of pixel areas; a second substrate comprising a second base substrate facing the first substrate, first to third color filters provided on the second base substrate, the first to third color filters being respectively disposed on locations corresponding to respective pixel areas of the plurality of pixel areas, and embodying different colors, and an infrared sensor disposed between the plurality of pixel areas in a plan view and configured to sense infrared light; a liquid crystal layer disposed between the first substrate and the second substrate; and a backlight unit configured to provide single-color light to the liquid crystal layer. At least one of the first to third color filters may include infrared quantum dot material which converts light provided from the backlight unit into infrared light.

The backlight unit may provide blue light, the first color filter may include red quantum dot material which converts the blue light into red light, the second color filter may include green quantum dot material which converts the blue light into green light, and the third color filter may allow the blue light to pass therethrough.

Each of the first to third color filters may include the infrared quantum dot material.

The third color filter may include scattering particles which scatters the blue light.

The first color filter may include a red quantum dot area including the red quantum dot material, and a first infrared quantum dot area including the infrared quantum dot material, and the second color filter may include a green quantum dot area including the green quantum dot material, and a second infrared quantum dot area including the infrared quantum dot material.

Any one of the first to third color filters may include first infrared quantum dot material which converts the blue light into first infrared light, another one of the first to third color filters may include second infrared quantum dot material which converts the blue light into second infrared light, and the first infrared light and the second infrared light may have different wavelength bands.

The infrared sensor may include a first infrared sensor configured to sense the first infrared light, and a second infrared sensor configured to sense the second infrared light.

The first infrared sensor and the second infrared sensor may be alternately arranged.

The second substrate may further include a light blocking pattern disposed on the second base substrate, and configured to expose the first to third color filters.

The first substrate may include a first base substrate, and a first driving layer including a pixel electrode disposed on a first surface of the first base substrate, and the second substrate may further include a second driving layer including a common electrode.

The display device may further include a first polarizing layer disposed on a second surface of the first base substrate, and a second polarizing layer disposed between the second base substrate and the second driving layer.

An embodiment of the present disclosure provides a display device including: a first substrate having a plurality of pixel areas; a second substrate comprising a second base substrate facing the first substrate, first to third color filters provided on the second base substrate, the first to third color filters being respectively disposed on locations corresponding to respective pixel areas of the plurality of pixel areas, and embodying different colors, and an infrared sensor disposed between the plurality of pixel areas in a plan view and configured to sense infrared light; a liquid crystal layer disposed between the first substrate and the second substrate; and a backlight unit configured to provide single-color light to the liquid crystal layer. The second substrate may further include an infrared light emitting area disposed on area other than the plurality of pixel areas and the infrared sensor in a plan view, and configured to emit infrared light by converting or transmitting light provided from the backlight unit.

The backlight unit may provide blue light, the first color filter may include red quantum dot material which converts the blue light into red light, the second color filter may include green quantum dot material which converts the blue light into green light, the third color filter may allow the blue light to pass therethrough, and the infrared light emitting area may include infrared quantum dot material which converts the blue light into the infrared light.

The third color filter may include scattering particles suitable for scattering the blue light.

The backlight unit may provide the infrared light, the first color filter may include red quantum dot material which converts the infrared light into red light, the second color filter may include green quantum dot material which converts the infrared light into green light, the third color filter may include blue quantum dot material which converts the infrared light into blue light, and the infrared light emitting area may allow the infrared light to pass therethrough.

One embodiment of the present disclosure provides a display device including a first substrate comprising a plurality of pixel areas, a second substrate facing the first substrate, and a backlight unit configured to provide single-color light to the liquid crystal layer. The second substrate may include an infrared light emitting area which includes infrared quantum dot material which converts light provided from the backlight unit into infrared light.

The infrared light emitting area may further includes quantum dot material which converts the single-color light provided from the backlight unit into a specific color light.

DETAILED DESCRIPTION

Hereinafter, embodiments will be described in greater detail with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, 'and/or' may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

Figure 1:
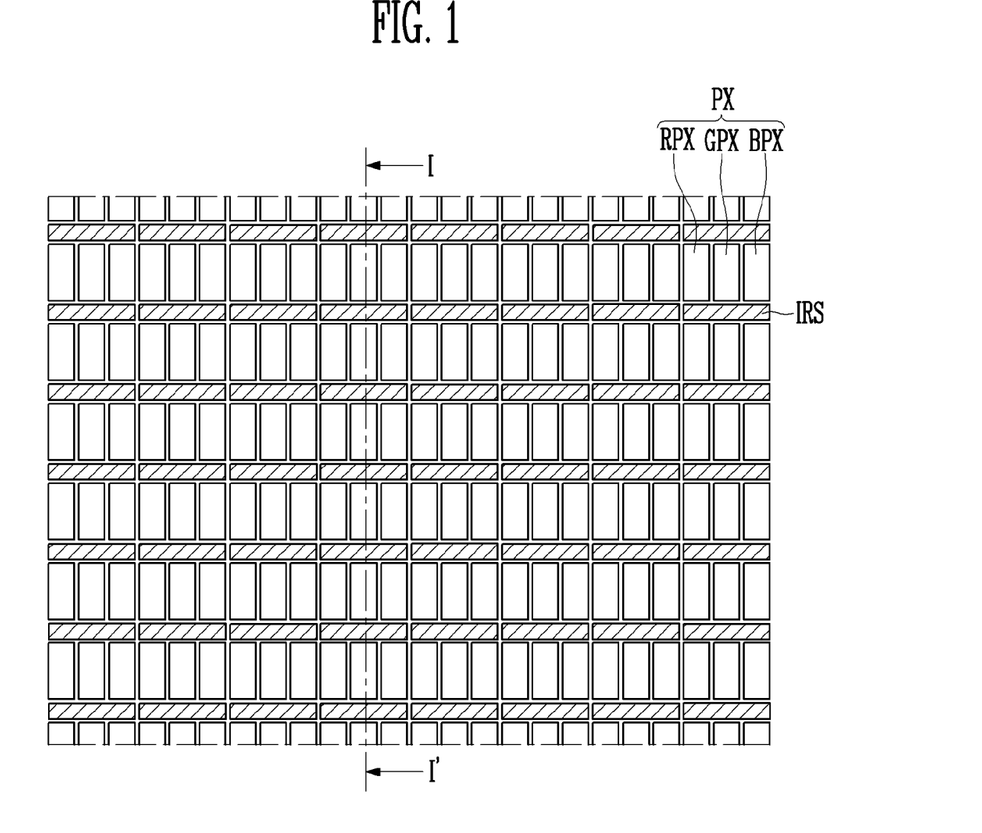
FIG. 1 is a plan view schematically illustrating arrangement of pixels of a display device according to a first embodiment of the present disclosure.
Figure 2:
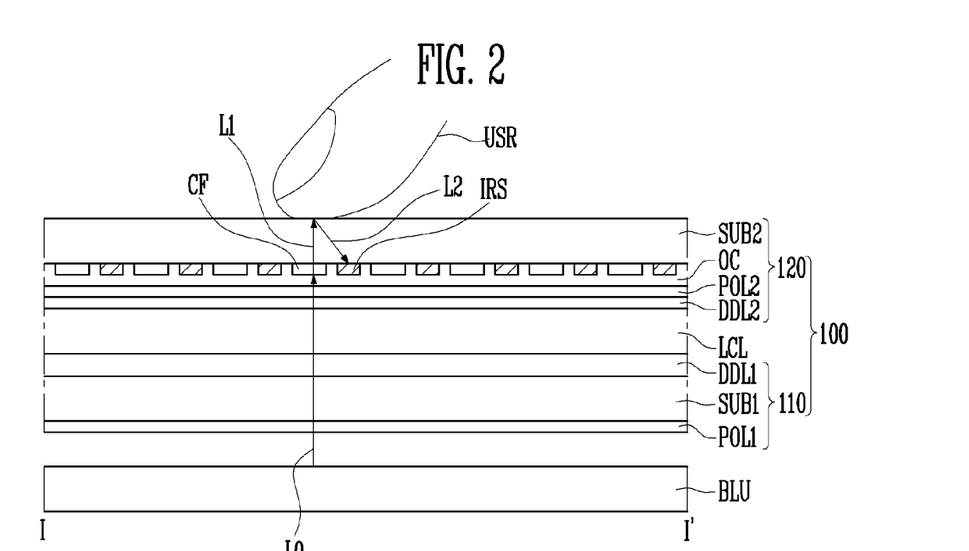
FIG. 2 is a sectional view taken along line I-I' of FIG. 1.

FIG. 1 is a plan view schematically illustrating arrangement of pixels of a display device according to a first embodiment of the present disclosure. FIG. 2 is a sectional view taken along line I-I' of FIG. 1.

For the sake of explanation, although FIG. 1 illustrates an enlargement of a portion of a display region of the display device, the display device actually has a structure in which the structure shown in FIG. 1 is repeatedly arranged.

Referring to FIGS. 1 and 2, the display device according to the first embodiment of the present disclosure may include a display panel 100, and a backlight unit BLU provided below the display panel 100.

The display panel 100 may include a plurality of pixels PX. In the present embodiment, each of the pixels PX may include a red pixel area RPX, a green pixel area GPX and a blue pixel area BPX. The red pixel area RPX is an area which emits red light. The green pixel area GPX is an area which emits green light. The blue pixel area BPX is an area which emits blue light. The red pixel area RPX, the green pixel area GPX and the blue pixel area BPX may form a single pixel, and be arranged parallel to each other in one direction. The plurality of pixels are repeatedly arranged in the display region in a matrix configuration. The arrangement of the pixels of the embodiment is exemplary, and the number of kinds of pixel areas PX may be more than three.

The display panel 100 may include an infrared sensor IRS which is disposed between the pixel areas PX and configured to sense infrared light. The infrared sensor IRS may be disposed in a light blocking area between the pixel areas PX. Although the infrared sensor IRS may be provided to correspond to one or more unit pixels, the present disclosure is not limited to this. In other words, the arrangement and the position of the infrared sensor IRS may be variously changed.

The display panel 100 may include a first substrate 110, a second substrate 120 and a liquid crystal layer LCL disposed between the first substrate 110 and the second substrate 120.

The first substrate 110 may include a first base substrate SUB1, a first driving layer DDL1 disposed on the first base substrate SUB1, and a first polarizing layer POL1.

The first base substrate SUB1 may include transparent insulating material and allow light to pass therethrough. The first base substrate SUB1 may be a rigid substrate. For example, the first base substrate SUB1 may be one of a glass substrate, a quartz substrate, a glass ceramic substrate, and a crystalline glass substrate.

Alternatively, the first base substrate SUB1 may be formed of a flexible substrate. Here, the first base substrate SUB1 may be either a film substrate or a plastic substrate which includes polymer organic material. For example, the first base substrate SUB1 may include at least one of the following: polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, materials constituting the first base substrate SUB1 may be changed, and include, for example, fiber reinforced plastic (FRP).

In an embodiment, the material used for the first base substrate SUB1 may have resistance (heat resistance) to high temperatures during a manufacturing process of the display device.

The first driving layer DDL1 may include at least one thin film transistor (not shown), and a pixel electrode (not shown) which is coupled to the thin film transistor.

The first polarizing layer POL1 may polarize light provided from the backlight unit BLU in a certain direction, and provide the polarized light to the liquid crystal layer LCL. The first polarizing layer POL1 may be disposed between the first base substrate SUB1 and the backlight unit BLU. In other words, the first polarizing layer POL1 may be disposed on the outer surface of the first base substrate SUB1. In the case where the first polarizing layer POL1 is disposed between the first base substrate SUB1 and the backlight unit BLU, the first polarizing layer POL1 may include a polarizing film.

The second substrate 120 may face the first substrate 110. The second substrate 120 may include a second base substrate SUB2, color filters CF, the infrared sensor IRS, a second polarizing layer POL2 and a second driving layer DDL2.

The second base substrate SUB2 may include the same material as that of the first base substrate SUB1.

The color filters CF correspond to the respective pixel areas PX. The color filters CF may include a red color filter (not shown) which overlaps the red pixel area RPX, a green color filter (not shown) which overlaps the green pixel area GPX, and a blue color filter (not shown) which overlaps the blue pixel area BPX.

The color filters CF may be disposed on one surface of the second base substrate SUB2, e.g., a surface facing the first substrate 110. Each of the color filters CF may embody a predetermined color using light provided from the backlight unit BLU. For example, each of the color filters CF may change the light provided from the backlight unit BLU to any one color of red, green, blue, white, cyan, magenta and yellow.

In the present embodiment, at least one of the color filters CF may include organic material and infrared quantum dot material dispersed in the organic material. The infrared quantum dot material may convert single-color light provided from the backlight unit BLU into infrared light.

The infrared sensor IRS may be an infrared touch sensor. The infrared sensor IRS may be provided on the second base substrate SUB2. The infrared sensor IRS may be disposed on the same layer as that of the color filters CF. The infrared sensor IRS may be disposed between the color filters CF. Although not shown in detail, the infrared sensor IRS may include a band-pass filter (not shown) provided on the second base substrate SUB2 and an infrared sensing thin film transistor (not shown) provided on the band-pass filter. The band-pass filter may prevent a visible ray from entering into the infrared sensing thin film transistor while allowing only infrared light to pass therethrough.

The second polarizing layer POL2 may transmit light which passes through the liquid crystal layer LCL. The second polarizing layer POL2 may include a wire grid polarizer (WGP).

In the present embodiment, there has been illustrated the case where the second polarizing layer POL2 is disposed between the second base substrate SUB2 and the second driving layer DDL2, but the present disclosure is not limited to this. For example, the second polarizing layer POL2 may be disposed on an outer surface of the second base substrate SUB2, that is, one of opposite surfaces of the second base substrate SUB2 that is not provided with the second driving layer DDL2.

The second driving layer DDL2 may be disposed on the second polarizing layer POL2. The second driving layer DDL2 may include a common electrode which forms an electric field with pixel electrode. The common electrode may form a vertical electric field with the pixel electrode. In an embodiment, the second driving layer DDL2 may be integrally provided with the first driving layer DDL1. In the case where the second driving layer DDL2 is integrally provided with the first driving layer DDL1, the pixel electrode and the common electrode may form a horizontal electric field.

The liquid crystal layer LCL may be disposed between the first substrate 110 and the second substrate 120. The liquid crystal layer LCL may include liquid crystal molecules. The liquid crystal molecules may be arranged in a certain direction by an electric field which is formed by the pixel electrode and the common electrode, thus adjusting a light transmittance of the liquid crystal layer LCL. Therefore, the liquid crystal layer LCL may allow light provided from the backlight unit BLU to pass therethrough so as to enable the display panel 100 to embody an image.

The backlight unit BLU may be disposed outside the display panel 100, and provide single-color light to the liquid crystal layer LCL. In the present embodiment, the backlight unit BLU provides blue light.

The backlight unit BLU may be provided at a position opposite to a light-emitting surface of the display panel 100, e.g., below the display panel 100. The backlight unit BLU may uniformly irradiate light to the display panel 100. Here, the backlight unit BLU may be embodied in a backlit type or an edge-lit type.

The backlight unit BLU may include a light guide plate (not shown), a single-color light source (not shown), an optical unit (not shown) and a reflective sheet (not shown).

The light guide plate may be disposed below the display panel 100 and the backlight unit BLU. The light guide plate may guide light which is emitted from the light source, for example, the backlight unit and emit the light to the display panel 100.

The light source may supply light to one side surface of the light guide plate or a lower surface of the light guide plate depending on the type of the backlight unit BLU. For example, in the case where the backlight unit BLU is a backlit type, the light source may supply light to the lower surface of the light guide plate. Alternatively, in the case where the backlight unit BLU is an edge-lit type, the light source may supply light to one side surface of the light guide plate. The light source may have a form in which a plurality of light-emitting diodes are mounted on a printed circuit board (PCB). All of the light-emitting diodes may emit the same color of light. For instance, the light-emitting diodes may emit blue light.

The optical unit may be disposed between the light guide plate and the display panel 100. The optical unit may control light which is provided form the light source and emitted through the light guide plate. The optical unit may include a diffusion sheet (not shown), a prism sheet (not shown) and a protective sheet (not shown) which are successively stacked.

The diffusion sheet may diffuse light emitted from the light guide plate. The prism sheet may collect light diffused from the diffusion sheet, in a direction perpendicular to a planar surface of the display panel 100 disposed over the prism sheet. As a result, most light passing through the prism sheet may be perpendicularly incident on the display panel 100. The protective sheet may be disposed on the prism sheet. The protective sheet may protect the prism sheet from an external impact.

In the present embodiment, there has been illustrated the case where the optical unit includes one diffusion sheet, one prism sheet, and one protective sheet, but the present disclosure is not limited to this. In the optical unit, at least one of the diffusion sheet, the prism sheet and the protective sheet may comprises a plurality of sheets, and any one of the diffusion sheet, the prism sheet and the protective sheet may be omitted, as needed.

The reflective sheet may be disposed between the light guide plate and a lower cover. The reflective sheet may reflect leaked light, other than light provided toward the display panel 100, among light emitted from the light source, and then change light-path toward the display panel 100. The reflective sheet may include material which reflects light. Therefore, the reflective sheet may increase an amount of light that is provided toward the display panel 100.

Hereinbelow, an infrared sensing method using the infrared sensor IRS will be described in brief.

As shown in FIG. 2, the backlight unit BLU provides blue light L0, and the blue light L0 successively passes through the first substrate 110, the liquid crystal layer LCL and the second substrate 120. When the blue light L0 passes through the color filters CF, the blue light L0 is converted into infrared light L1 by the infrared quantum dot material included in the color filters CF. When a user's finger USR touches the display panel 100, the infrared light L1 emitted from the display panel 100 is reflected by the user's finger USR and the reflected light, infrared reflected light L2, is incident on and sensed by the infrared sensor IRS disposed in the second substrate 120. In this way, the operation of sensing the touch of the user's finger USR may be performed, whereby information about whether the touch of the user's finger USR is present, the location of the touch, etc. may be obtained.

Figure 3:
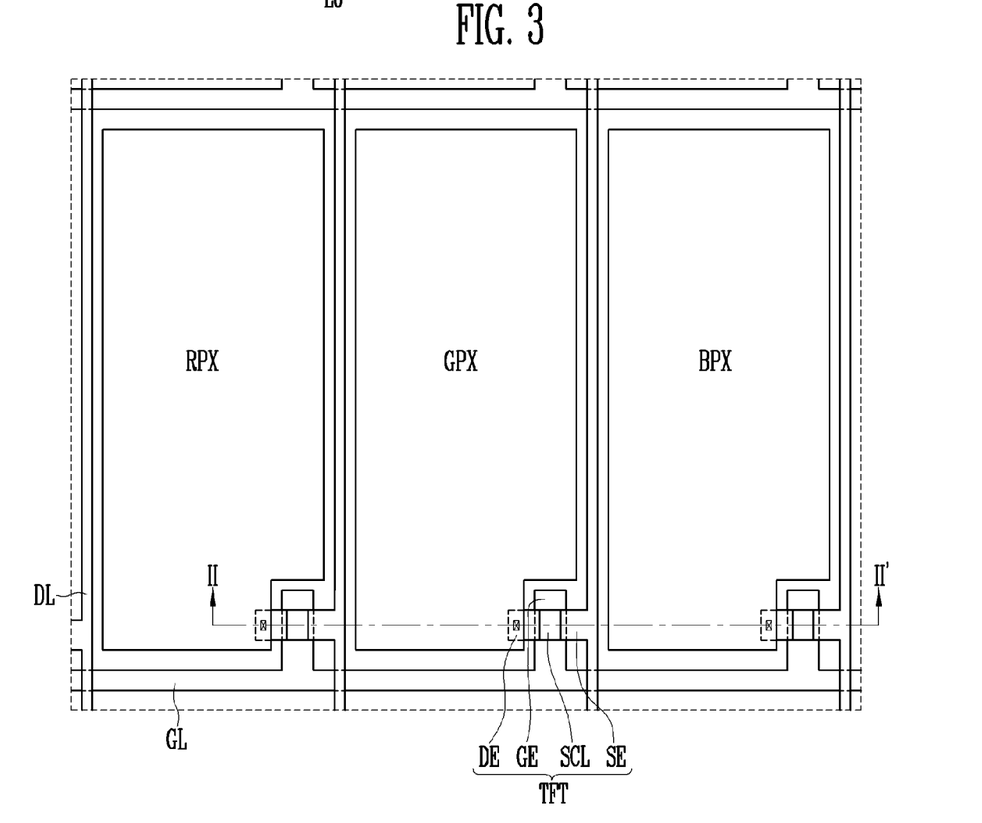
FIG. 3 is a plan view illustrating an RGB pixel of a display panel shown in FIG. 1.
Figure 4:
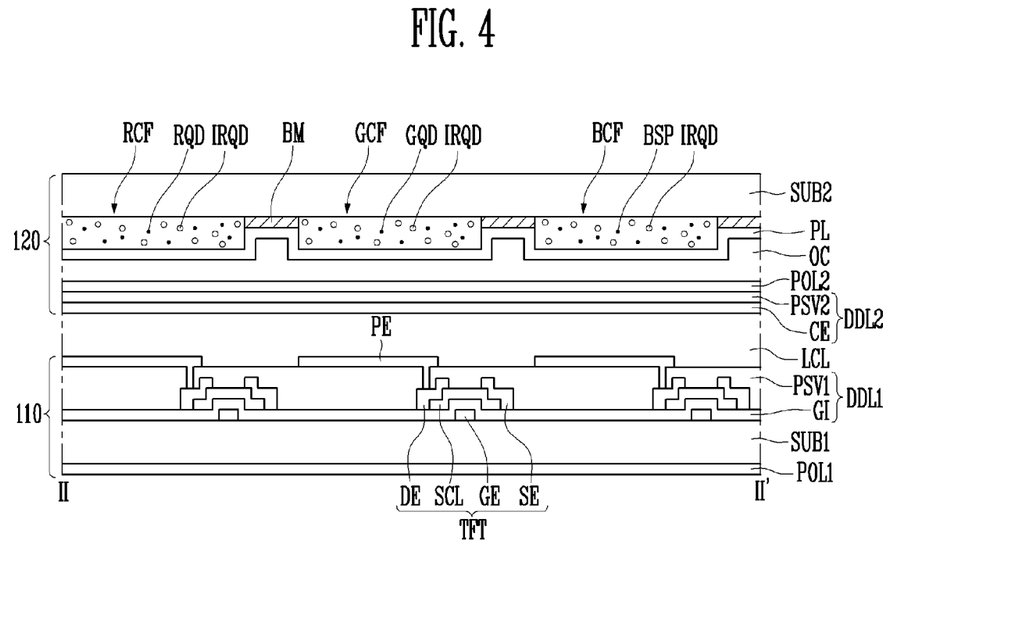
FIG. 4 is a sectional view taken along line II-II' of FIG. 3.

FIG. 3 is a plan view illustrating an RGB pixel of the display panel shown in FIG. 1. FIG. 4 is a sectional view taken along line II-II' of FIG. 3.

The display panel 100 may include a red pixel area RPX, a green pixel area GPX and a blue pixel area BPX. The display panel 100 may include a first substrate 110, a second substrate 120 and a liquid crystal layer LCL disposed between the first substrate 110 and the second substrate 120.

The first substrate 110 may include a first base substrate SUB1, a first driving layer DDL1 disposed on the first base substrate SUB1, and a first polarizing layer POL1.

The first polarizing layer POL1 may polarize a light provided from the backlight unit BLU (refer to "BLU" of FIG. 2) in a certain direction, and provide the polarized light to the liquid crystal layer LCL. The first polarizing layer POL1 may be disposed between the first base substrate SUB1 and the backlight unit BLU.

The first driving layer DDL1 may include at least one of thin film transistor (TFT) which is provided on the first base substrate SUB1, and a pixel electrode PE which is coupled with the thin film transistor TFT.

The thin film transistor TFT may include a gate electrode GE, a semiconductor layer SCL, a source electrode SE, and a drain electrode DE.

Hereinafter, the thin film transistor TFT will described in detail.

The gate electrode GE may be disposed on the first base substrate SUB1. The gate electrode GE may be coupled to a gate line GL. For example, the gate electrode GE may have a shape in which it protrudes from a portion of the gate line GL. An insulating layer (not shown) may be disposed between the gate electrode GE and the first base substrate SUB1.

A gate insulating layer GI which covers the gate electrode GE may be disposed on the gate electrode GE. The gate insulating layer GI may include at least one of organic insulating material and inorganic insulating material. For example, the gate insulating layer GI may include at least one of silicon oxide and silicon nitride.

The semiconductor layer SCL may be disposed on the gate insulating layer GI. The semiconductor layer SCL may at least partially overlap the gate electrode GE. The semiconductor layer SCL may include any one of amorphous silicon (a-Si), polycrystalline silicon (p-Si), and an oxide semiconductor. Areas on the semiconductor layer SCL that are coupled to the source electrode SE and the drain electrode DE may be a source area and a drain area, which have been doped with impurities, or into which impurities have been injected. An area between the source area and the drain area may be a channel area. The oxide semiconductor may include at least one of zinc (Zn), indium (In), gallium (Ga), tin (Sn), and a mixture thereof. For example, the oxide semiconductor may include indium-gallium-zinc oxide (IGZO).

A first end of the source electrode SE may be coupled to a data line DL which intersects the gate line GL. For example, the source electrode SE may have a shape in which it protrudes from a portion of the data line DL. A second end of the source electrode SE may be coupled to a first end of the semiconductor layer SCL, e.g., the source area.

The drain electrode DE may be disposed at a position spaced apart from the source electrode SE. A first end of the drain electrode DE may be coupled to a second end of the semiconductor layer SCL, e.g., the drain area, and a second end of the drain electrode DE may be coupled with the pixel electrode PE.

As described above, there has been illustrated a thin film transistor having a bottom gate structure in which the gate electrode GE of the thin film transistor TFT is disposed below the semiconductor layer SCL, but the present disclosure is not limited to this. For example, the thin film transistor TFT may be a thin film transistor having a top gate structure in which the gate electrode GE is disposed over the semiconductor layer SCL.

The first substrate 110 may further include a first passivation layer PSV1 which is disposed on the thin film transistor TFT. The first passivation layer PSV1 may cover the thin film transistor TFT, and expose the second end of the drain electrode DE.

The first passivation layer PSV1 may include at least one of an inorganic protective layer and an organic protective layer. For instance, the first passivation layer PSV1 may include an inorganic protective layer which covers the thin film transistor TFT, and an organic protective layer which is disposed on the inorganic protective layer. The inorganic protective layer may include at least one of silicon oxide and silicon nitride. For example, the inorganic protective layer may cover the thin film transistor TFT. The organic protective layer may include organic insulating material which allows light to pass therethrough. For example, the organic protective layer may include at least one of polyacrylates resin, epoxy resin, phenolic resin, polyamides resin, polyimides resin, unsaturated polyesters resin, poly-phenylen ethers resin, poly-phenylene sulfides resin, and benzocyclobutene resin.

The pixel electrode PE may be disposed on the first passivation layer PSV1. The pixel electrode PE may be coupled with the second end of the drain electrode DE. The pixel electrode PE may include transparent conductive oxide. For example, the pixel electrode PE may include at least one of indium tin oxide (ITO), indium zinc oxide (IZO), aluminum zinc oxide (AZO), gallium doped zinc oxide (GZO), zinc tin oxide (ZTO), gallium tin oxide (GTO) and fluorine doped tin oxide (FTO).

Although not shown in the drawings, the pixel electrode PE may include a plurality of slits to precisely control the liquid crystal molecules that are included in the liquid crystal layer LCL.

The second substrate 120 may face the first substrate 110. The second substrate 120 may include a second base substrate SUB2, color filters CF, an infrared sensor IRS, a second polarizing layer POL2 and a second driving layer DDL2.

The second base substrate SUB2 may include the same material as that of the first base substrate SUB1.

The color filters CF may be disposed on one surface of the second base substrate SUB2, e.g., a surface thereof facing the first substrate 110. Locations of color filters CF correspond to locations of respective pixel areas PX. The color filters CF may include a red color filter (RCF) which overlaps the red pixel area RPX, a green color filter (GCF) which overlaps the green pixel area GPX, and a blue color filter (BCF) which overlaps the blue pixel area BPX.

At least one of the color filters CF may include organic material, and infrared quantum dot material dispersed in the organic material. In the embodiment, each of the color filters RCF, GCF and BCF includes the infrared quantum dot material IRQD. The infrared quantum dot material IRQD may convert single-color light provided from the backlight unit BLU into infrared light.

In the present embodiment, the backlight unit BLU provides blue light. A mixture of the infrared quantum dot material IRQD and red quantum dot material RQD which converts the blue light into red light is distributed in the red color filter RCF. Therefore, the red color filter RCF may convert the blue light incident thereon into red light and infrared light, and emit the converted light. A mixture of the infrared quantum dot material IRQD and green quantum dot material GQD which converts the blue light into green light is distributed in the green color filter GCF. Therefore, the green color filter GCF may convert the blue light incident thereon into green light and infrared light, and emit the converted light.

The blue color filter BCF allows the blue light to pass therethrough. In the present embodiment, a mixture of the infrared quantum dot material IRQD and scattering particles BSP which scatter the blue light is distributed in the blue color filter BCF. In an embodiment, the blue color filter BCF may be made of transparent photoresist which allows light in the whole wavelength range to pass therethrough.

A light blocking pattern BM may be disposed between the color filters RCF, GCF and BCF. The light blocking pattern BM may expose the red pixel area RPX, the green pixel area GPX and the blue pixel area BPX of the second base substrate SUB2. The light blocking pattern BM may prevent light which is provided from the backlight unit BLU, and passes through the liquid crystal layer LCL and the color filters RCF, GCF and BCF, from mixing in different pixel areas, whereby the color reproduction performance may be prevented from deteriorating. Furthermore, the light blocking pattern BM may prevent external light from being incident on and reflected by the display panel 100.

A protective layer PL and a planarization layer OC may be successively stacked on the color filters RCF, GCF and BCF. The protective layer PL and the planarization layer OC may include transparent organic material or inorganic material.

The second polarizing layer POL2 may be disposed on the planarization layer OC, and selectively transmit or block light passing through the liquid crystal layer LCL. The second polarizing layer POL2 may include a wire grid polarizer (WGP).

The second driving layer DDL2 may include a second passivation layer PSV2 disposed on the second polarizing layer POL2, and a common electrode CE disposed on the second passivation layer PSV2.

The second passivation layer PSV2 may insulate the second polarizing layer POL2 from the common electrode CE. In addition, the second passivation layer PSV2 may planarize the surface of the second polarizing layer POL2.

The common electrode CE, along with the pixel electrode PE, may form an electric field. The common electrode CE may include transparent conductive oxide. For example, the common electrode CE may include the same material as that of the pixel electrode PE.

Figure 5:
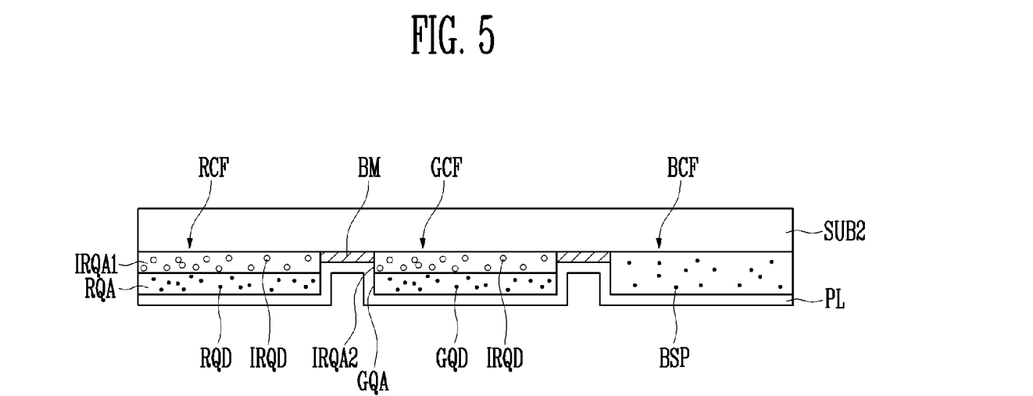
FIG. 5 is a partial sectional view illustrating color filters according to a second embodiment of the present disclosure.

FIG. 5 is a partial sectional view illustrating color filters according to a second embodiment of the present disclosure.

Hereinbelow, the configuration of the display device according to the present embodiment may be substantially the same as that described above; therefore, any repetitive detailed explanation will be omitted.

Referring to FIG. 5, at least one of color filters RCF, GCF and BCF according to the second embodiment of the present disclosure may include two or more areas made of different quantum dot materials.

In detail, the red color filter RCF may include a red quantum dot area RQA which contains red quantum dot material RQD, and a first infrared quantum dot area IRQA1 which overlaps the red quantum dot area RQA and contains the infrared quantum dot material IRQD. The green color filter GCF may include a green quantum dot area GQA which contains green quantum dot material GQD, and a second infrared quantum dot area IRQA2 which overlaps the green quantum dot area GQA and contains the infrared quantum dot material IRQD. The blue color filter BCF may include only scattering particles BSP. In the present embodiment, the backlight unit BLU provides blue light.

Figure 6A:
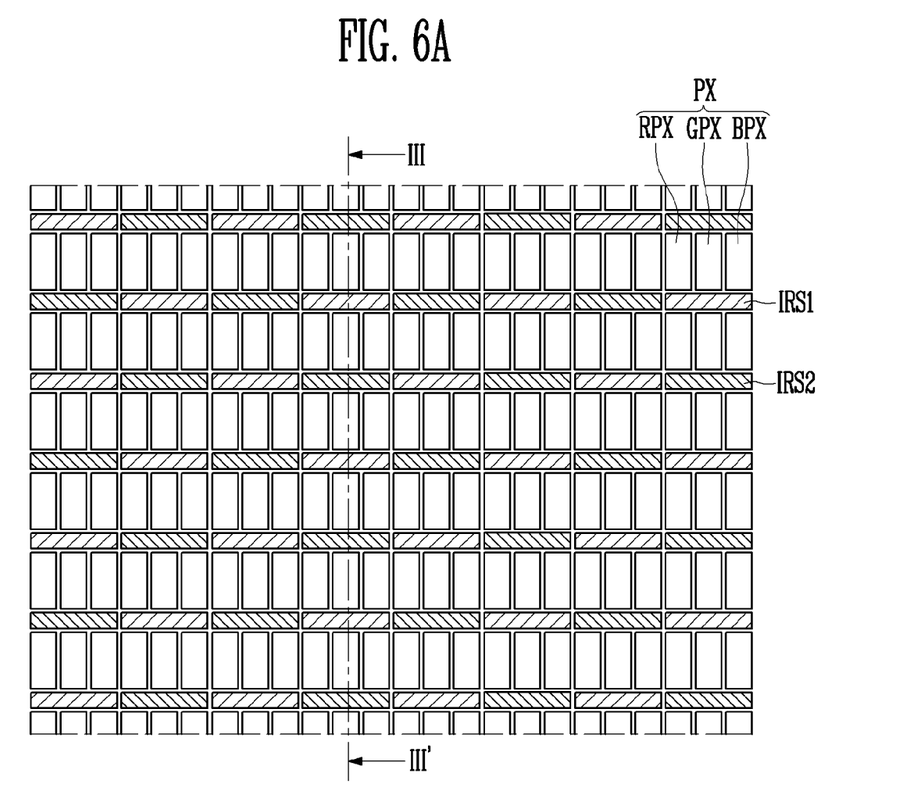
FIG. 6A is a plan view schematically illustrating arrangement of pixels of a display device according to a third embodiment of the present disclosure.
Figure 6B:
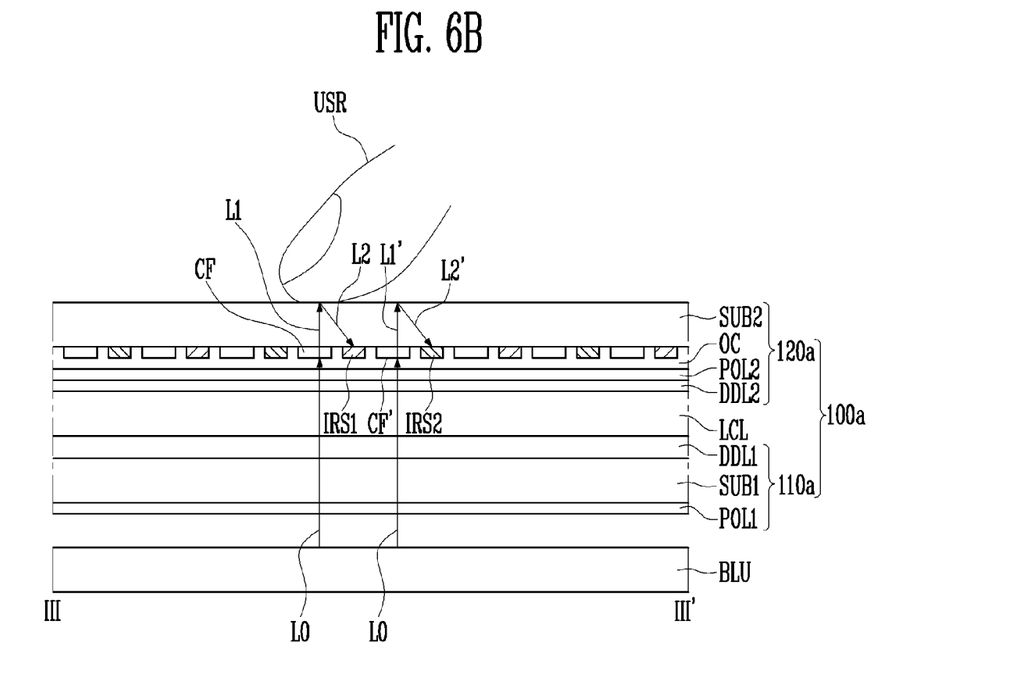
FIG. 6B is a sectional view taken along line III-III' of FIG. 6A.
Figure 6C:
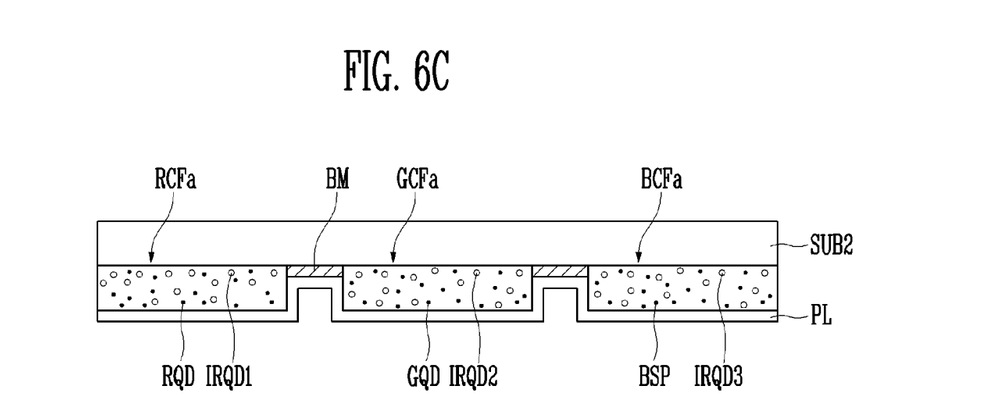
FIG. 6C is a partial sectional view illustrating color filters of FIG. 6B.

FIG. 6A is a plan view schematically illustrating arrangement of pixels of a display device according to a third embodiment of the present disclosure. FIG. 6B is a sectional view taken along line III-III' of FIG. 6A. FIG. 6C is a partial sectional view illustrating color filters of FIG. 6B.

Referring to FIGS. 6A and 6B, the display device according to the third embodiment of the present disclosure may include a first infrared sensor IRS1 which senses first infrared light, and a second infrared sensor IRS2 which senses second infrared light. The first infrared light and the second infrared light have different wavelength bands. In other words, the first infrared sensor IRS1 and the second infrared sensor IRS2 sense infrared light having different wavelength bands.

As described in the above-described embodiments, each of the pixels PX may include a red pixel area RPX, a green pixel area GPX and a blue pixel area BPX. The first infrared sensor IRS1 and the second infrared sensor IRS2 may be disposed between the plurality of pixel rows. The first infrared sensor IRS1 and the second infrared sensor IRS2 may be alternately arranged in a row direction between the plurality of pixel rows to form an infrared sensor row. The first infrared sensor IRS1 and the second infrared sensor IRS2 may be alternately arranged in a column direction too. Although each of the first infrared sensor IRS1 and the second infrared sensor IRS2 may be provided to correspond to one or more pixels, the present disclosure is not limited to this. In other words, the arrangement and the positions of the first infrared sensor IRS1 and the second infrared sensor IRS2 may be variously changed.

The configuration of a display panel 100a according to the present embodiment may be substantially the same as that of the display panel 100 described above, other than the first infrared sensor IRS1 and the second infrared sensor IRS2; therefore, any repetitive detailed explanation will be omitted.

Referring to FIG. 6C, when it is assumed that the backlight unit BLU according to the present embodiment provides blue light, any one of color filters RCFa, GCFa and BCFa may include first infrared quantum dot material IRQD1 which converts the blue light into the first infrared light, and another one of them may include second infrared quantum dot material IRQD2 which converts the blue light into the second infrared light.

In detail, a mixture of the first infrared quantum dot material IRQD1 and red quantum dot material RQD which converts the blue light into red light is distributed in the red color filter RCFa. Therefore, the red color filter RCFa converts the blue light incident thereon into red light and the first infrared light and emits the converted light. A mixture of the second infrared quantum dot material IRQD2 and green quantum dot material GQD which converts the blue light into green light is distributed in the green color filter GCFa. Therefore, the green color filter GCFa converts the blue light incident thereon into green light and the second infrared light and emits the converted light.

The blue color filter BCFa allows the blue light to pass therethrough. In the present embodiment, a mixture of third infrared quantum dot material IRQD3 and scattering particles BSP which scatter the blue light is distributed in the blue color filter BCFa. The third infrared quantum dot material IRQD3 may be the same as at least one of the first infrared quantum dot material IRQD1 and the second infrared quantum dot material IRQD2, or different from the first infrared quantum dot material IRQD1 and the second infrared quantum dot material IRQD2.

Hereinbelow, an infrared sensing method using the first infrared sensor IRS1 and the second infrared sensor IRS2 will be described in brief.

As described in FIG. 6B, the backlight unit BLU provides blue light L0 to the display panel 100a. The blue light L0 successively passes through the first substrate 110a, the liquid crystal layer LCL and the second substrate 120a. When the blue light L0 passes through first color filters CF, the blue light L0 is converted into a first infrared light L1 by the first infrared quantum dot material IRQD1 included in the first color filters CF. For example, each of the first color filters CF may be the red color filter RCFa.

When the blue light L0 passes through second color filters CF', the blue light L0 is converted into a second infrared light L1' by the second infrared quantum dot material IRQD2 included in the second color filters CF'. For example, each of the second color filters CF' may be the green color filter GCFa.

When a user's finger USR touches the display panel 100, the first infrared light L1 and the second infrared light L1' which are emitted from the display panel 100a are reflected by the user's finger USR. The reflected first and second infrared lights L1 and L1' are respectively referred to as first infrared reflected light L2 and second infrared reflected light L2'. The first infrared reflected light L2 is incident on and sensed by the first infrared sensor IRS1 disposed in the second substrate 120a. The second infrared reflected light L2' is incident on and sensed by the second infrared sensor IRS2 disposed in the second substrate 120a.

The display device according to the present embodiment is configured to emit infrared light in different wavelength bands and sense the emitted infrared light, using different infrared sensors IRS1 and IRS2. Consequently, separation of noise may be facilitated, whereby sensing accuracy may be enhanced.

Figure 7A:
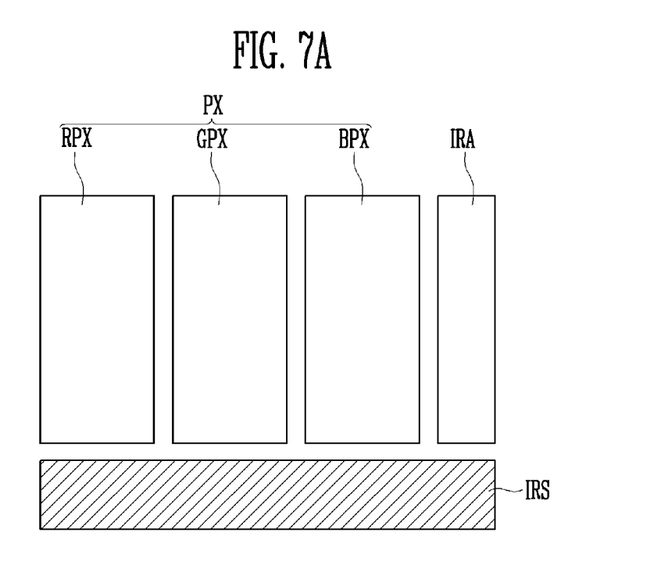
FIG. 7A is a plan view illustrating arrangement of pixels of a display device according to a fourth embodiment of the present disclosure.
Figure 7B:
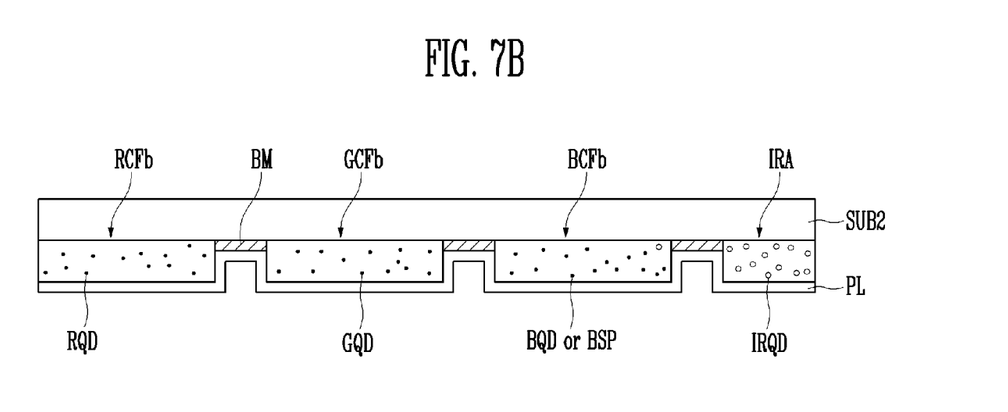
FIG. 7B is a partial sectional view illustrating color filters and an infrared light emitting unit of FIG. 7A.

FIG. 7A is a plan view illustrating arrangement of pixels of a display device according to a fourth embodiment of the present disclosure. FIG. 7B is a partial sectional view illustrating color filters and an infrared light emitting unit of FIG. 7A.

Referring to FIGS. 7A and 7B, a display device according to a fourth embodiment of the present disclosure may further include an infrared light emitting area IRA which is disposed on area other than the pixel PX and the infrared sensor IRS, and emits infrared light by converting or transmitting light provided from backlight unit BLU.

In an embodiment, in the case where the backlight unit BLU provides blue light, red quantum dot material RQD which converts the blue light into red light is distributed in a red color filter RCFb. Green quantum dot material GQD which converts the blue light into green light is distributed in a green color filter GCFb. Scattering particles BSP which scatter the blue light are distributed in a blue color filter BCFb. The infrared light emitting area IRA includes infrared quantum dot material IRQD which converts the blue light into the infrared light.

In an embodiment, in the case where the backlight unit BLU provides infrared light, red quantum dot material RQD which converts the infrared light into red light is distributed in the red color filter RCFb. Green quantum dot material GQD which converts the infrared light into green light is distributed in the green color filter GCFb. Blue quantum dot material BQD which converts the infrared light into blue light is distributed in the blue color filter BCFb. The infrared light emitting area IRA allows the infrared light to pass therethrough.

As described above, according to the present disclosure, at least one of first to third color filters includes infrared quantum dot material that converts light provided from a backlight unit into infrared light, or a second substrate has an infrared light emitting unit that emits infrared light. As a result, the display device does not need an additional IR light source for infrared sensor. Thus, the backlight unit may have a single light source, whereby the display device may have more efficient structure, and the manufacturing cost thereof may be reduced.

Furthermore, the display device is configured to emit infrared rays in different wavelength bands, using quantum dot material, and sense the emitted infrared rays. Consequently, separation of noise may be facilitated, whereby sensing accuracy may be enhanced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
a first substrate comprising a plurality of pixel areas;
a second substrate comprising a second base substrate facing the first substrate, first to third color filters provided on the second base substrate, the first to third color filters being respectively disposed on locations corresponding to respective pixel areas of the plurality of pixel areas and each embodying different colors from each other, and an infrared sensor disposed between the plurality of pixel areas and configured to sense infrared light; and
a light source configured to provide single-color light to the second substrate,
wherein at least one of the first to third color filters includes, in a portion embodying one of the different colors, infrared quantum dot material which is configured to convert visible light provided from the light source into infrared light.

2. The display device of claim 1,
wherein the light source provides blue light,
wherein the first color filter includes red quantum dot material which converts the blue light into red light,
wherein the second color filter includes green quantum dot material which converts the blue light into green light, and
wherein the third color filter allows the blue light to pass therethrough.

3. The display device of claim 2, wherein each of the first to third color filters includes the infrared quantum dot material.

4. The display device of claim 2, wherein the third color filter includes scattering particles which scatters the blue light.

5. The display device of claim 2,
wherein the first color filter comprises a red quantum dot area including the red quantum dot material, and a first infrared quantum dot area including the infrared quantum dot material, and
wherein the second color filter comprises a green quantum dot area including the green quantum dot material, and a second infrared quantum dot area including the infrared quantum dot material.

6. The display device of claim 2,
wherein any one of the first to third color filters includes first infrared quantum dot material which converts the blue light into first infrared light,
wherein another one of the first to third color filters includes second infrared quantum dot material which converts the blue light into second infrared light, and
wherein the first infrared light and the second infrared light have different wavelength bands.

7. The display device of claim 6, wherein the infrared sensor comprises:
a first infrared sensor configured to sense the first infrared light, and
a second infrared sensor configured to sense the second infrared light.

8. The display device of claim 7, wherein the first infrared sensor and the second infrared sensor are alternately arranged.

9. The display device of claim 1, wherein the second substrate further comprises:
a light blocking pattern disposed on the second base substrate, and configured to expose the first to third color filters.

10. The display device of claim 1,
wherein the first substrate comprises a first base substrate, and a first driving layer including a pixel electrode disposed on a first surface of the first base substrate, and
wherein the second substrate further comprises a second driving layer including a common electrode.

11. The display device of claim 10, further comprising:
a liquid crystal layer disposed between the first substrate and the second substrate,
wherein the light source is a backlight unit configured to provide the single-color light to the liquid crystal layer.

12. The display device of claim 10, further comprising:
a first polarizing layer disposed on a second surface of the first base substrate; and
a second polarizing layer disposed between the second base substrate and the second driving layer.

13. A display device comprising:
a first substrate comprising a plurality of pixel areas;
a second substrate facing the first substrate;
a light source configured to provide single-color light to the second substrate, and
a light blocking pattern disposed between the plurality of pixel areas,
wherein the second substrate includes an infrared light emitting area which includes infrared quantum dot material which is configured to convert visible light provided from the light source into infrared light, and
wherein the light blocking pattern does not overlap any infrared quantum dot materials in a plan view.

14. The display device of claim 13, wherein the infrared light emitting area further includes a quantum dot material which converts the single-color light provided from the light source into a specific color light.

15. The display device of claim 13, further comprising:
a liquid crystal layer disposed between the first substrate and the second substrate,
wherein the light source is a backlight unit configured to provide the single-color light to the liquid crystal layer.

* * * * *